US008970984B1

(12) United States Patent
Kloeppel

(10) Patent No.: US 8,970,984 B1
(45) Date of Patent: Mar. 3, 2015

(54) GROOVED CYLINDRICAL SEAL WITH INCREASED RADIAL CLEARANCE FOR REDUCED COST DISK DRIVE SPINDLE

(71) Applicant: Western Digital Technologies, Inc., Irvine, CA (US)

(72) Inventor: Klaus Kloeppel, Royal Oaks, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/264,337

(22) Filed: Apr. 29, 2014

(51) Int. Cl.
*G11B 17/02* (2006.01)
*G11B 19/20* (2006.01)
*F16C 32/06* (2006.01)

(52) U.S. Cl.
CPC ........ *G11B 19/2036* (2013.01); *F16C 32/0651* (2013.01)
USPC ............ 360/99.08; 360/96.07; 360/99.04

(58) Field of Classification Search
USPC ............ 310/90; 360/98.07, 99.04, 99.08, 360/245.3–245.4; 384/100
See application file for complete search history.

(56) References Cited

U.S. PATENT DOCUMENTS

| | | | |
|---|---|---|---|
| 5,235,482 A | 8/1993 | Schmitz | |
| 5,499,153 A * | 3/1996 | Uemura et al. | 360/234.6 |
| 6,023,114 A | 2/2000 | Mori et al. | |
| 6,046,889 A | 4/2000 | Berding et al. | |
| 6,052,890 A | 4/2000 | Malagrino, Jr. et al. | |
| 6,061,206 A | 5/2000 | Foisy et al. | |
| 6,066,903 A * | 5/2000 | Ichiyama | 310/90 |
| 6,101,876 A | 8/2000 | Brooks et al. | |
| 6,147,831 A | 11/2000 | Kennedy et al. | |
| 6,149,159 A | 11/2000 | Kloeppel et al. | |
| 6,151,189 A | 11/2000 | Brooks | |
| 6,151,197 A | 11/2000 | Larson et al. | |
| 6,154,339 A * | 11/2000 | Grantz et al. | 360/99.08 |
| 6,185,067 B1 | 2/2001 | Chamberlain | |
| 6,185,074 B1 | 2/2001 | Wang et al. | |
| 6,208,486 B1 | 3/2001 | Gustafson et al. | |
| 6,215,616 B1 | 4/2001 | Phan et al. | |
| 6,288,866 B1 | 9/2001 | Butler et al. | |
| 6,292,333 B1 | 9/2001 | Blumentritt et al. | |
| 6,344,950 B1 | 2/2002 | Watson et al. | |
| 6,349,464 B1 | 2/2002 | Codilian et al. | |
| 6,388,873 B1 | 5/2002 | Brooks et al. | |
| 6,417,979 B1 | 7/2002 | Patton, III et al. | |
| 6,421,208 B1 | 7/2002 | Oveyssi | |
| 6,441,998 B1 | 8/2002 | Abrahamson | |
| 6,462,914 B1 | 10/2002 | Oveyssi et al. | |
| 6,466,398 B1 | 10/2002 | Butler et al. | |
| 6,469,871 B1 | 10/2002 | Wang | |
| 6,502,300 B1 | 1/2003 | Casey et al. | |
| 6,519,112 B1 | 2/2003 | Iwaki | |
| 6,519,116 B1 | 2/2003 | Lin et al. | |
| 6,529,345 B1 | 3/2003 | Butler et al. | |

(Continued)

*Primary Examiner* — Wayne Young
*Assistant Examiner* — Carlos E Garcia

(57) ABSTRACT

A spindle includes a fixed member, a hub rotatably attached to the fixed member, and a bearing between the rotatable hub and the fixed member. The bearing including a bearing lubricant. A seal reduces migration of the bearing lubricant away from the bearing. The seal includes an immobile cylindrical surface of the fixed member, and a rotatable cylindrical surface of the hub. One of these surfaces includes a plurality of grooves. The immobile cylindrical surface and the rotatable cylindrical surface are concentric about the hub rotation axis. The rotatable cylindrical surface faces and is separated from the immobile cylindrical surface by a gas-filled radial clearance of not less than 50 microns.

22 Claims, 6 Drawing Sheets

(56) References Cited

U.S. PATENT DOCUMENTS

| | | | |
|---|---|---|---|
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,064 B1 * | 5/2003 | Hirano ........................ 360/97.12 |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,640 B2 | 3/2004 | Nishio et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,943,985 B2 | 9/2005 | Kull et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,137,739 B2 | 11/2006 | Dittmer et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et al. |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,239,477 B2 | 7/2007 | Aiello et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |

(56) References Cited

U.S. PATENT DOCUMENTS

| | | | |
|---|---|---|---|
| 7,298,584 B1 | 11/2007 | Yamada et al. | |
| 7,327,537 B1 | 2/2008 | Oveyssi | |
| 7,339,268 B1 | 3/2008 | Ho et al. | |
| 7,342,746 B1 | 3/2008 | Lin | |
| RE40,203 E | 4/2008 | Hatch et al. | |
| 7,353,524 B1 | 4/2008 | Lin et al. | |
| 7,369,368 B1 | 5/2008 | Mohajerani | |
| 7,372,670 B1 | 5/2008 | Oveyssi | |
| 7,375,929 B1 | 5/2008 | Chang et al. | |
| 7,379,266 B1 | 5/2008 | Ou-Yang et al. | |
| 7,381,904 B1 | 6/2008 | Codilian | |
| 7,385,784 B1 | 6/2008 | Berding et al. | |
| 7,388,731 B1 | 6/2008 | Little et al. | |
| 7,420,771 B1 | 9/2008 | Hanke et al. | |
| 7,434,987 B1 | 10/2008 | Gustafson et al. | |
| 7,435,001 B2 * | 10/2008 | Kainoh et al. | 384/100 |
| 7,436,625 B1 | 10/2008 | Chiou et al. | |
| 7,440,234 B1 | 10/2008 | Cheng et al. | |
| 7,477,488 B1 | 1/2009 | Zhang et al. | |
| 7,477,489 B1 | 1/2009 | Chen et al. | |
| 7,484,291 B1 | 2/2009 | Ostrander et al. | |
| 7,505,231 B1 | 3/2009 | Golgolab et al. | |
| 7,529,064 B1 | 5/2009 | Huang et al. | |
| 7,538,981 B1 | 5/2009 | Pan | |
| 7,561,374 B1 | 7/2009 | Codilian et al. | |
| 7,567,410 B1 | 7/2009 | Zhang et al. | |
| 7,576,947 B2 | 8/2009 | Higuchi et al. | |
| 7,576,955 B1 | 8/2009 | Yang et al. | |
| 7,593,181 B1 | 9/2009 | Tsay et al. | |
| 7,605,999 B1 | 10/2009 | Kung et al. | |
| 7,609,486 B1 | 10/2009 | Little | |
| 7,610,672 B1 | 11/2009 | Liebman | |
| 7,633,721 B1 | 12/2009 | Little et al. | |
| 7,633,722 B1 | 12/2009 | Larson et al. | |
| 7,656,609 B1 | 2/2010 | Berding et al. | |
| 7,660,075 B1 | 2/2010 | Lin et al. | |
| 7,672,083 B1 | 3/2010 | Yu et al. | |
| 7,684,155 B1 | 3/2010 | Huang et al. | |
| 7,686,555 B1 | 3/2010 | Larson et al. | |
| 7,709,078 B1 | 5/2010 | Sevier et al. | |
| 7,715,149 B1 | 5/2010 | Liebman et al. | |
| 7,729,091 B1 | 6/2010 | Huang et al. | |
| 7,751,145 B1 | 7/2010 | Lin et al. | |
| 7,826,177 B1 | 11/2010 | Zhang et al. | |
| 7,852,601 B1 | 12/2010 | Little | |
| 7,864,488 B1 | 1/2011 | Pan | |
| 7,898,770 B1 | 3/2011 | Zhang et al. | |
| 7,903,369 B1 | 3/2011 | Codilian et al. | |
| 7,907,369 B1 | 3/2011 | Pan | |
| 7,911,742 B1 | 3/2011 | Chang et al. | |
| 7,926,167 B1 | 4/2011 | Liebman et al. | |
| 7,957,095 B1 | 6/2011 | Tsay et al. | |
| 7,957,102 B1 | 6/2011 | Watson et al. | |
| 7,961,436 B1 | 6/2011 | Huang et al. | |
| 8,004,782 B1 | 8/2011 | Nojaba et al. | |
| 8,009,384 B1 | 8/2011 | Little | |
| 8,018,687 B1 | 9/2011 | Little et al. | |
| 8,031,431 B1 | 10/2011 | Berding et al. | |
| 8,064,168 B1 | 11/2011 | Zhang et al. | |
| 8,064,170 B1 | 11/2011 | Pan | |
| 8,068,314 B1 | 11/2011 | Pan et al. | |
| 8,081,401 B1 | 12/2011 | Huang et al. | |
| 8,100,017 B1 | 1/2012 | Blick et al. | |
| 8,116,038 B1 | 2/2012 | Zhang et al. | |
| 8,125,740 B1 | 2/2012 | Yang et al. | |
| 8,142,671 B1 | 3/2012 | Pan | |
| 8,156,633 B1 | 4/2012 | Foisy | |
| 8,159,785 B1 | 4/2012 | Lee et al. | |
| 8,189,298 B1 | 5/2012 | Lee et al. | |
| 8,194,348 B2 | 6/2012 | Jacoby et al. | |
| 8,194,354 B1 | 6/2012 | Zhang et al. | |
| 8,194,355 B1 | 6/2012 | Pan et al. | |
| 8,203,806 B2 | 6/2012 | Larson et al. | |
| 8,223,453 B1 | 7/2012 | Norton et al. | |
| 8,228,631 B1 | 7/2012 | Tsay et al. | |
| 8,233,239 B1 | 7/2012 | Teo et al. | |
| 8,248,733 B1 | 8/2012 | Radavicius et al. | |
| 8,259,417 B1 | 9/2012 | Ho et al. | |
| 8,274,760 B1 | 9/2012 | Zhang et al. | |
| 8,276,256 B1 | 10/2012 | Zhang et al. | |
| 8,279,560 B1 | 10/2012 | Pan | |
| 8,284,514 B1 | 10/2012 | Garbarino | |
| 8,289,646 B1 | 10/2012 | Heo et al. | |
| 8,300,352 B1 | 10/2012 | Larson et al. | |
| 8,305,708 B2 | 11/2012 | Tacklind | |
| 8,320,086 B1 | 11/2012 | Moradnouri et al. | |
| 8,322,021 B1 | 12/2012 | Berding et al. | |
| 8,345,387 B1 | 1/2013 | Nguyen | |
| 8,363,351 B1 | 1/2013 | Little | |
| 8,369,044 B2 | 2/2013 | Howie et al. | |
| 8,385,017 B2 | 2/2013 | Mizukami et al. | |
| 8,388,227 B2 * | 3/2013 | Yu | 384/119 |
| 8,411,389 B1 | 4/2013 | Tian et al. | |
| 8,416,522 B1 | 4/2013 | Schott et al. | |
| 8,416,534 B1 | 4/2013 | Heo et al. | |
| 8,422,171 B1 | 4/2013 | Guerini | |
| 8,422,175 B1 | 4/2013 | Oveyssi | |
| 8,432,641 B1 | 4/2013 | Nguyen | |
| 8,437,101 B1 | 5/2013 | German et al. | |
| 8,438,721 B1 | 5/2013 | Sill | |
| 8,446,688 B1 | 5/2013 | Quines et al. | |
| 8,451,559 B1 | 5/2013 | Berding et al. | |
| 8,467,153 B1 | 6/2013 | Pan et al. | |
| 8,472,131 B1 | 6/2013 | Ou-Yang et al. | |
| 8,477,460 B1 | 7/2013 | Liebman | |
| 8,488,270 B2 | 7/2013 | Brause et al. | |
| 8,488,280 B1 | 7/2013 | Myers et al. | |
| 8,499,652 B1 | 8/2013 | Tran et al. | |
| 8,514,514 B1 | 8/2013 | Berding et al. | |
| 8,520,335 B2 | 8/2013 | Mizukami et al. | |
| 8,530,032 B1 | 9/2013 | Sevier et al. | |
| 8,542,465 B2 | 9/2013 | Liu et al. | |
| 8,547,664 B1 | 10/2013 | Foisy et al. | |
| 8,553,355 B2 | 10/2013 | Mizukami et al. | |
| 8,553,356 B1 | 10/2013 | Heo et al. | |
| 8,553,366 B1 | 10/2013 | Hanke | |
| 8,553,367 B1 | 10/2013 | Foisy et al. | |
| 8,562,221 B2 * | 10/2013 | Kim | 384/119 |
| 8,616,900 B1 | 12/2013 | Lion | |
| 8,665,555 B1 | 3/2014 | Young et al. | |
| 8,667,667 B1 | 3/2014 | Nguyen et al. | |
| 8,693,139 B2 | 4/2014 | Tian et al. | |
| 8,693,140 B1 | 4/2014 | Weiher et al. | |
| 8,699,179 B1 | 4/2014 | Golgolab et al. | |
| 8,702,998 B1 | 4/2014 | Guerini | |
| 8,705,201 B2 | 4/2014 | Casey et al. | |
| 8,705,209 B2 | 4/2014 | Seymour et al. | |
| 2001/0007519 A1 | 7/2001 | Nishio et al. | |
| 2004/0090702 A1 | 5/2004 | Aiello et al. | |
| 2005/0162027 A1 | 7/2005 | Aiello et al. | |
| 2006/0284504 A1 | 12/2006 | Aiello et al. | |
| 2008/0130168 A1 | 6/2008 | Higuchi et al. | |
| 2011/0101807 A1 * | 5/2011 | Yu | 310/90 |
| 2011/0212281 A1 | 9/2011 | Jacoby et al. | |
| 2012/0033329 A1 | 2/2012 | Mizukami et al. | |
| 2012/0033330 A1 | 2/2012 | Mizukami et al. | |
| 2013/0038964 A1 | 2/2013 | Garbarino et al. | |
| 2013/0091698 A1 | 4/2013 | Banshak, Jr. et al. | |
| 2013/0128379 A1 | 5/2013 | Mizukami et al. | |
| 2013/0155546 A1 | 6/2013 | Heo et al. | |
| 2013/0290988 A1 | 10/2013 | Watson et al. | |

\* cited by examiner

US 8,970,984 B1

GROOVED CYLINDRICAL SEAL WITH INCREASED RADIAL CLEARANCE FOR REDUCED COST DISK DRIVE SPINDLE

BACKGROUND

Disk drives are a type of information storage device that store information on at least one spinning disk. Other types of information storage devices include, for example, magnetic tape drives which retrieve stored information on magnetic tape (e.g. linear tape drive, helical scan tape drive). There are several types of disk drives. Magnetic hard disk drives typically store information on non-removable rigid magnetic disks. There are also optical disk drives, which typically retrieve information stored on removable optical disk media. Also for example, there are magneto-optical disk drives, which share some of the characteristics of optical disk drives and magnetic hard disk drives.

All types of disk drives typically include a spindle motor that supports and spins at least one disk media. The spindle motor typically includes a lubricant (e.g. grease in a ball bearing spindle, fluid of a fluid bearing spindle, etc.) that is desired to be sealed within the spindle so as to not excessively outgas, migrate, or otherwise contaminate the inside environment of the disk drive. Such lubricant outgassing or migration can contaminate the recording head/disk interface and thereby adversely affect the performance and/or reliability of the disk drive. Therefore, disk drive spindles may include a seal to reduce lubricant outgassing or migration into the disk drive internal environment.

Pumping seals have been disclosed in the past to reduce lubricant outgassing or migration into the disk drive internal environment. Such seals may have pumping air grooves on one of a pair of adjacent surfaces that exhibit relative motion due to spindle rotation. Such pumping grooves can pump air towards a region of locally increased air pressure that the grooves create between the spindle and the rest of the disk drive internal environment. Such region of locally increased pressure can reduce the outgassing, migration, or diffusion of lubricant from the spindle into the rest of the internal environment of the disk drive.

However, a grooved pumping seal requires the corresponding pair of adjacent surfaces in relative motion (due to spindle rotation) to be very closely spaced (e.g. about 25 microns or less), or else the local increase in air pressure due to the pumping grooves may be negligible. Such close spacing of adjacent surfaces in relative motion requires tight tolerances, precision fabrication, and careful handling during assembly, which can undesirably raise the cost of spindle and disk drive manufacture. Therefore, there is a need in the art for a disk drive spindle that includes an active labyrinth seal that adequately reduces lubricant migration or outgassing, but also allows a greater or relaxed spacing between adjacent surfaces in relative motion, for reduced manufacturing cost.

DETAILED DESCRIPTION OF EXAMPLE EMBODIMENTS

Figure 1:
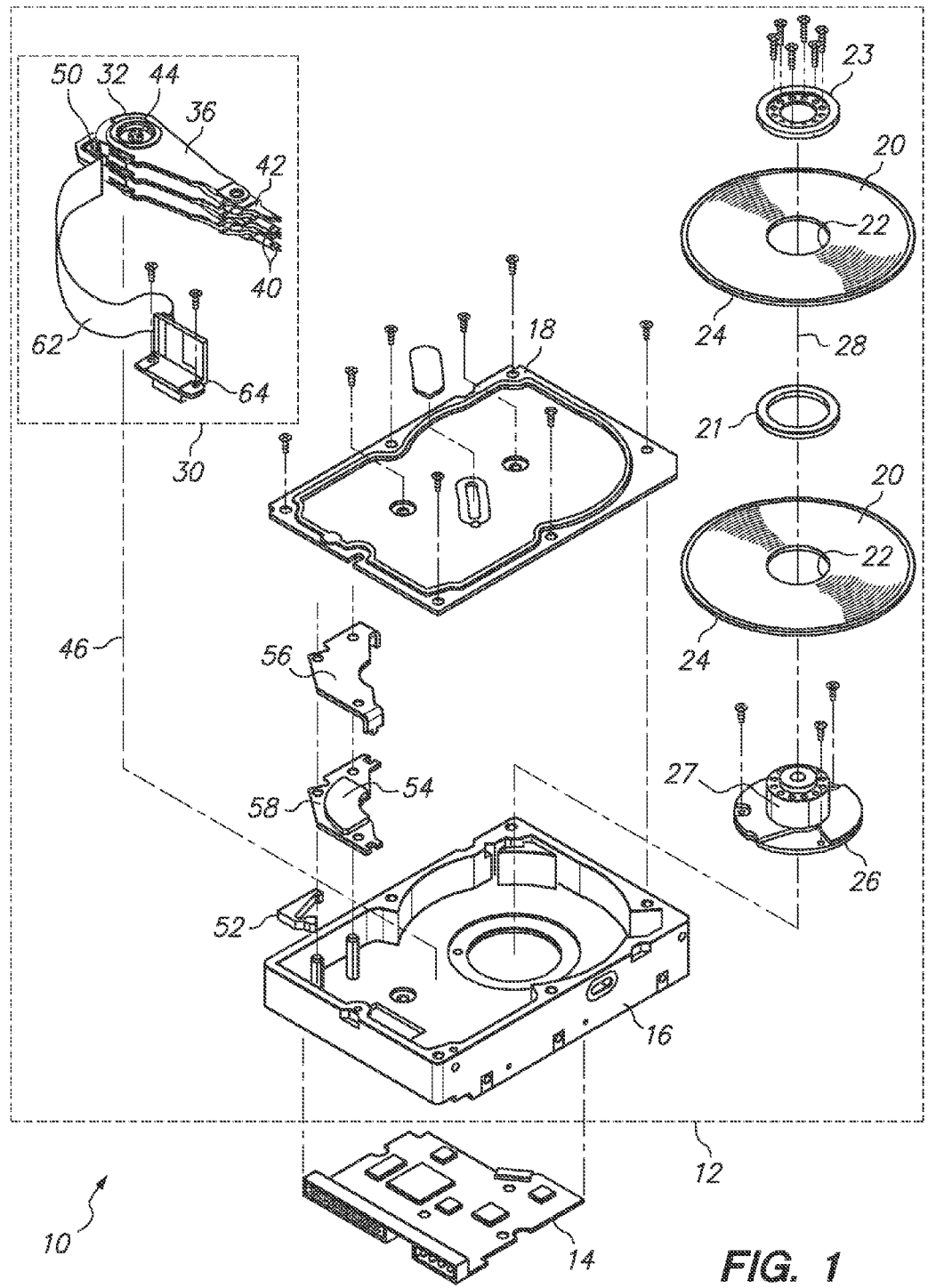
FIG. 1 is an exploded perspective view of a disk drive capable of including an embodiment of the present invention.

FIG. 1 is an exploded perspective view of a disk drive 10 capable of including an embodiment of the present invention. The disk drive 10 includes a head disk assembly (HDA) 12 and a printed circuit board assembly (PCBA) 14. The HDA 12 includes a disk drive base 16 and cover 18 that together house disks 20. Disks 20 may be annular magnetic disks or optical disks, for example. Each of the disks 20 may contain a plurality of concentric tracks for storing data, disposed upon its opposing disk major surfaces between a disk outer edge 24 and a disk inner edge 22.

In the embodiment of FIG. 1, the HDA 12 further includes a rotary spindle 26 for rotating the disks 20 about a disk axis of rotation 28. The rotary spindle 26 is attached to the disk drive base 16 of the HDA 12. Disks 20 may be stacked and separated with one or more annular disk spacers 21 that are clamped to a rotatable hub 27 of the rotary spindle 26 by a disk clamp 23.

In the embodiment of FIG. 1, the HDA 12 further includes a head stack assembly (HSA) 30 pivotably attached to the disk drive base 16 of HDA 12. Specifically, the HSA 30 may be pivotably attached to the disk drive base 16 by use of a head actuator assembly pivot 44 that is engaged within a bore of an actuator body 32, and that is attached to the disk drive base 16. The head actuator assembly pivot 44 may facilitate the HSA 30 to pivot relative to HDA 12 about an actuator pivot axis 46.

One or more actuator arms 36 may extend from the actuator body 32, and one or more head gimbal assemblies (HGA) 42 may be attached to a distal end of each actuator arm 36. Each HGA 42 may include a head 40 for reading and writing data from and to an adjacent disk surface. Note that the head(s) 40 may be referred to as a "read head" herein, so long as it can read, even if it has other structures and functions (e.g. writing). The HSA 30 may further include a coil 50. The coil 50 may interact with one or more magnets 54 attached to disk drive base 16 via a yoke structure 56, 58, to form a voice coil motor for controllably pivoting the HSA 30. The HDA 12 also optionally includes a latch 52 pivotably mounted on the disk drive base 16 to prevent undesired angular displacements of HSA 30.

In the embodiment of FIG. 1, the PCBA 14 may include a servo control system for generating servo control signals to control the current through the coil 50 and thereby position the HSA 30 relative to concentric tracks disposed upon the surfaces of disks 20. The HSA 30 may be electrically connected to PCBA 14 via a flex cable 62 and a flex cable support bracket 64 that is fixed to the disk drive base 16 (i.e. does not pivot with the rest of the HSA 30).

Figure 2:
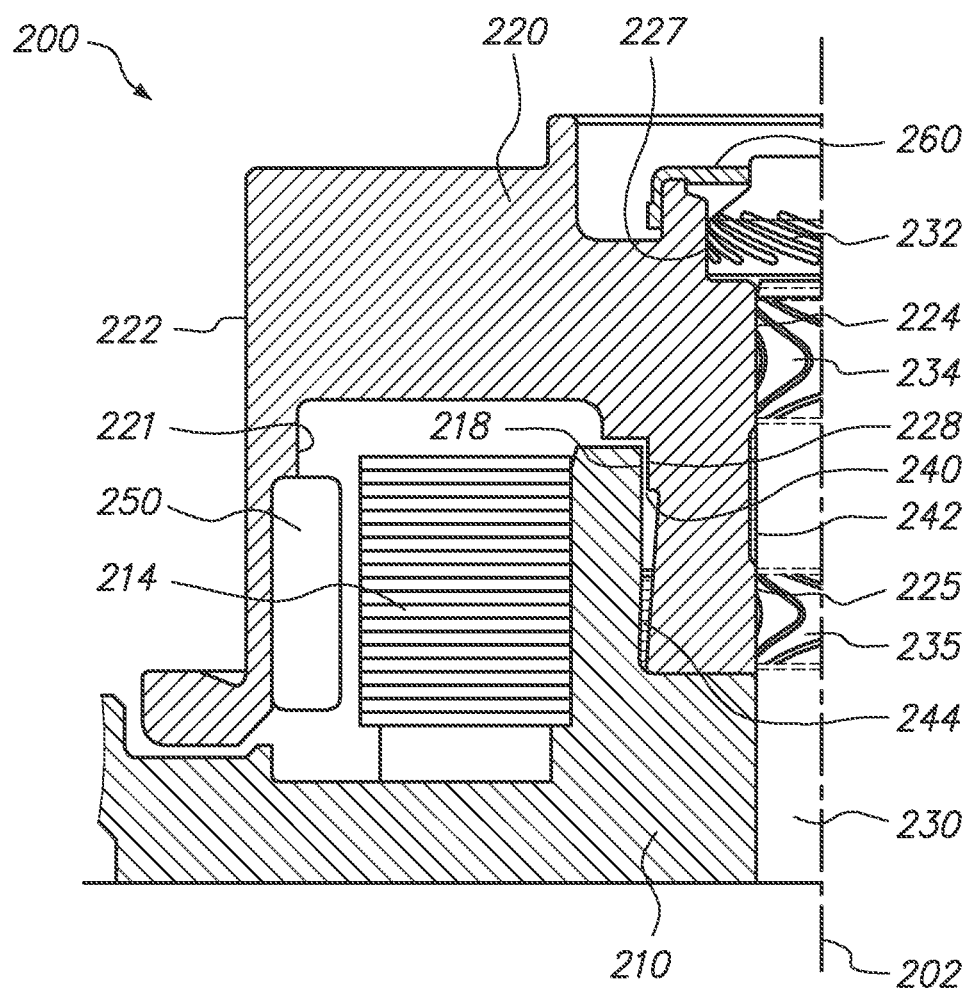
FIG. 2 is cross-sectional view of a spindle according to an example embodiment of the present invention.

FIG. 2 is cross-sectional view of a spindle 200 according to an example embodiment of the present invention. The spindle 200 includes a fixed member 210, and a rotatable hub 220 rotatably attached to the fixed member 210. In the embodiment of FIG. 2, the fixed member 210 includes a fixed shaft 230 and a fixed stator coil 214 that does not rotate relative to the fixed member 210. The rotatable hub 220 includes a rotatable ferromagnet 250 (e.g. an annular ferromagnet affixed to an inner surface 221 of the rotatable hub 220).

Magnetic interaction between the fixed stator coil 214 and the rotatable ferromagnet 250 may torque the rotatable hub 220, causing it to rotate relative to the fixed member 210 and about a hub rotation axis 202. Note that in the embodiment of FIG. 2, the rotatable hub 220 surrounds the ferromagnet 250 and the fixed stator coil 214. In this regard, the fixed stator coil 214 and the ferromagnet 250 may be considered as being optional "in-hub motor" components of the spindle 200.

In the embodiment of FIG. 2, the rotatable hub 220 may optionally include an outer cylindrical surface 222 about which magnetic recording disks may be fitted. The rotation of the rotatable hub 220 relative to the fixed member 210 may be facilitated by a fluid bearing that shears and pressurizes a bearing lubricant 244 as a working fluid between bearing surfaces 224, 225, 227 of the rotatable hub 220 and the bearing surfaces 234, 235, 232 of the fixed shaft 230 of the fixed member 210. Note that in the embodiment of FIG. 2, grooves in the bearing surfaces 234, 235, 232 of the fixed shaft 230 of the fixed member 210 may help pressurize the working fluid lubricant and thereby stiffen the fluid bearing to better control the rotational motion of the rotatable hub 220.

In the embodiment of FIG. 2, a conventional fluid bearing may also exist between certain other facing surfaces of the rotatable hub 220 and the fixed member 210, for example horizontal facing surfaces that may form a so-called thrust bearing. The bearing lubricant 244 may comprise a light oil that fills a lubricant reservoir 242 adjacent the bearing surfaces 224, 225 of the rotatable hub 220 and bearing surfaces 234, 235 of the fixed shaft 230 of the fixed member 210. In an alternative embodiment, the bearing between the fixed shaft 230 of the fixed member 210 and the rotatable hub 220 may be a conventional ball bearing that is lubricated with grease. In the embodiment of FIG. 2, a bearing cap 260 may help reduce migration of the bearing lubricant 244 from the top of the spindle 200.

In the embodiment of FIG. 2, the fixed member 210 includes an immobile cylindrical surface 218 that is concentric about the hub rotation axis 202, and the rotatable hub 220 includes a rotatable cylindrical surface 228 that is also concentric about the hub rotation axis 202. The rotatable cylindrical surface 228 faces and is separated from the immobile cylindrical surface 218 by a gas-filled radial clearance 240 of not less than 50 microns. In the embodiment of FIG. 2, the immobile cylindrical surface 218 of the fixed member 210 surrounds the rotatable cylindrical surface 228 of the rotatable hub 220.

In certain embodiments, the gas-filled radial clearance 240 may be filled with air from an environment outside the spindle 200. In certain alternative embodiments, the gas-filled radial clearance 240 may be filled with helium or nitrogen from an environment outside the spindle 200 but within a disk drive housing. In this context, a clearance is considered to be filled with helium or nitrogen if it is filled by a gas that is mostly helium or mostly nitrogen (i.e. 100% gas purity is not required).

In the embodiment of FIG. 2, the immobile cylindrical surface 218 and/or the rotatable cylindrical surface 228 includes a plurality of grooves (not shown in the cross-section of FIG. 2). Because the gas-filled radial clearance 240 is not less than 50 microns, the grooves on the immobile cylindrical surface 218 and/or the rotatable cylindrical surface 228 cannot serve as pumping grooves. Still, contrary to conventional wisdom, the grooves can disturb the gas sufficiently to reduce migration of the bearing lubricant 244 away from the bearing through the gas-filled radial clearance 240. Hence, the gas-filled radial clearance 240 can function as an adequate seal that includes the immobile cylindrical surface 218 of the fixed member 210 and the rotatable cylindrical surface 228 of the rotatable hub 220, which seal is made effective enough by grooves (even though the surface-to-surface clearance is too great for such grooves to pump the gas). In certain embodiments, the gas-filled radial clearance 240 being not less than 50 microns represents a relaxed spacing between the immobile cylindrical surface 218 and the rotatable cylindrical surface 228, which relaxed spacing can facilitate a reduced manufacturing cost.

In the embodiment of FIG. 2, the gas-filled radial clearance 240 is shaped as a thin gaseous cylinder that is oriented parallel to the hub rotation axis 202 (i.e. vertical orientation in FIG. 2). In certain embodiments, such shape and orientation of the gas-filled radial clearance 240 enhances the sealing effect of the surface grooves, perhaps because fluid motion due to centrifugal forces may be better contained by adjacent surfaces that are parallel to the hub rotation axis 202 (i.e. vertical in FIG. 2), than would be so, for example, in a disk shaped clearance formed between hypothetical adjacent sealing surfaces oriented transverse to the hub rotation axis 202 (i.e. horizontal in FIG. 2).

Figure 3:
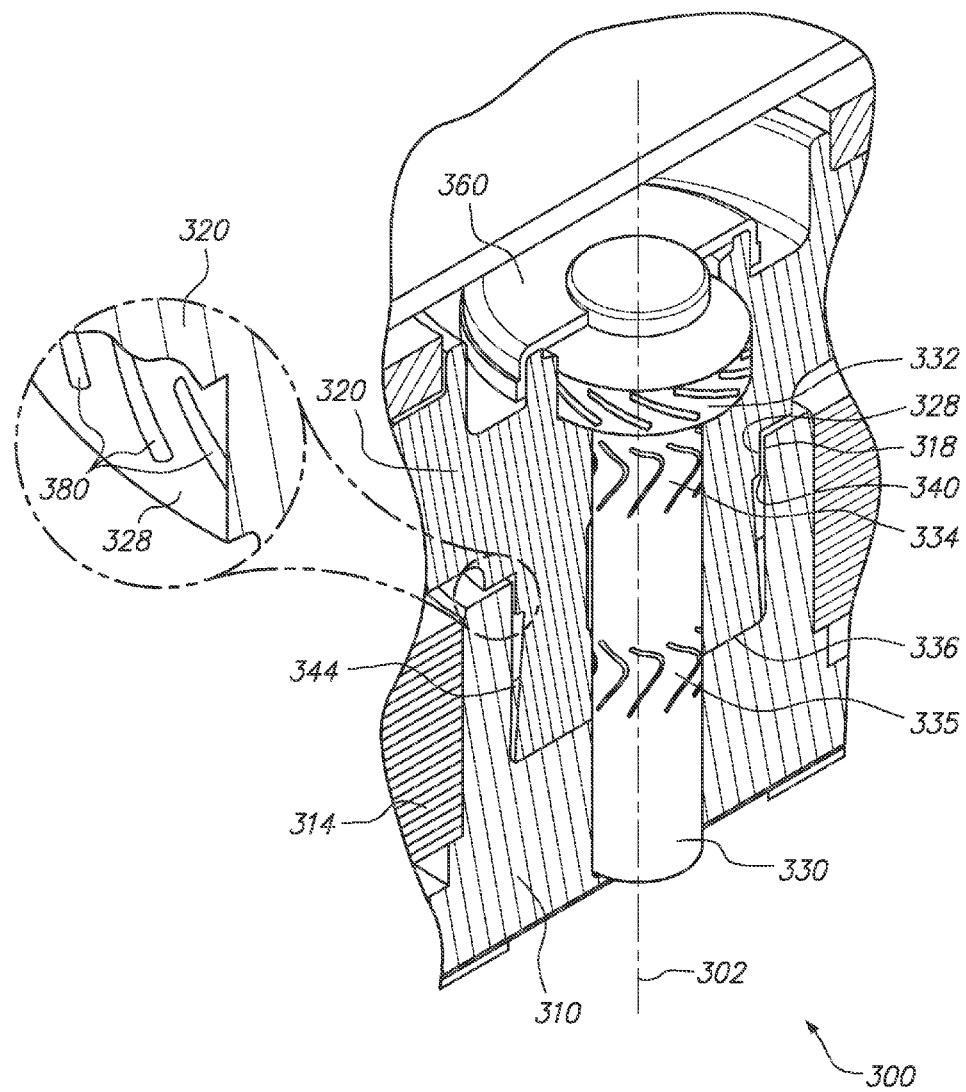
FIG. 3 is a cut away view of a spindle according to an example embodiment of the present invention.

FIG. 3 is a cut away view of a spindle 300 according to an example embodiment of the present invention. The spindle 300 includes a fixed member 310, and a rotatable hub 320 rotatably attached to the fixed member 310. In the embodiment of FIG. 3, the fixed member 310 includes a fixed shaft 330 and a fixed stator coil 314 that does not rotate relative to the fixed member 310. The rotation of the rotatable hub 320 relative to the fixed member 310 may be facilitated by a fluid bearing that shears and pressurizes a bearing lubricant 344 as a working fluid between bearing surfaces of the rotatable hub 320 and the bearing surfaces 334, 335, 332 of the fixed shaft 330 of the fixed member 310. Note that in the embodiment of FIG. 3, grooves in the bearing surfaces 334, 335, 332 of the fixed shaft 330 of the fixed member 310 may help pressurize the working fluid lubricant and thereby stiffen the fluid bearing to better control the rotational motion of the rotatable hub 320.

In the embodiment of FIG. 3, a conventional fluid bearing may also exist between certain other facing surfaces of the rotatable hub 320 and the fixed member 310, for example horizontal facing surfaces 336 that may form a so-called thrust bearing. The bearing lubricant 344 may comprise a light oil, for example. In an alternative embodiment, the bearing between the fixed shaft 330 of the fixed member 310 and the rotatable hub 320 may be a conventional ball bearing that is lubricated with grease. In the embodiment of FIG. 3, a bearing cap 360 may help reduce migration of the bearing lubricant 344 from the top of the spindle 300.

In the embodiment of FIG. 3, the fixed member 310 includes an immobile cylindrical surface 318 that is concentric about the hub rotation axis 302, and the rotatable hub 320 includes a rotatable cylindrical surface 328 that is also concentric about the hub rotation axis 302. In the embodiment of FIG. 3, the immobile cylindrical surface 318 of the fixed member 310 surrounds the rotatable cylindrical surface 328 of the rotatable hub 320. The rotatable cylindrical surface 328 faces and is separated from the immobile cylindrical surface 318 by a gas-filled radial clearance 340 of not less than 50 microns. In certain embodiments, the gas-filled radial clearance 340 may be filled with air from an environment outside the spindle 300. In certain alternative embodiments, the gas-filled radial clearance 340 may be filled with helium or nitrogen from an environment outside the spindle 300 but within a disk drive housing.

In the embodiment of FIG. 3, the rotatable cylindrical surface 328 includes a plurality of grooves 380. For example, in certain embodiments the plurality of grooves 380 preferably defines a groove depth in the range of 10 microns to 30 microns. Note that the term cylindrical applies to the rotatable cylindrical surface 328 in the present context, notwithstanding the grooves 380, in view of the cylindrical shape of the non-grooved portions of the rotatable cylindrical surface 328. Also, the gas-filled radial clearance 340 is measured from the non-grooved portions of the surfaces. That is, the gas-filled radial clearance 340 is not measured to include the groove depth.

Because the gas-filled radial clearance 340 is not less than 50 microns, the grooves 380 on the rotatable cylindrical surface 328 cannot serve as pumping grooves. Still, contrary to conventional wisdom, the grooves 380 can disturb the gas sufficiently to reduce migration of the bearing lubricant 344 away from the bearing through the gas-filled radial clearance 340. Hence, the gas-filled radial clearance 340 can function as an adequate seal that includes the immobile cylindrical surface 318 of the fixed member 310 and the grooved rotatable cylindrical surface 328 of the rotatable hub 320, which seal is made effective enough by grooves 380 (even though the surface-to-surface clearance is too great for the grooves 380 to pump the gas). In certain embodiments, the gas-filled radial clearance 340 being not less than 50 microns represents a relaxed spacing between the immobile cylindrical surface 318 and the rotatable cylindrical surface 328, which relaxed spacing can facilitate a reduced manufacturing cost.

In the embodiment of FIG. 3, the gas-filled radial clearance 340 is shaped as a thin gaseous cylinder that is oriented parallel to the hub rotation axis 302 (i.e. vertical orientation in FIG. 3). In certain embodiments, such shape and orientation of the gas-filled radial clearance 340 enhances the sealing effect of the surface grooves 380, perhaps because fluid motion due to centrifugal forces may be better contained by adjacent surfaces that are parallel to the hub rotation axis 302 (i.e. vertical in FIG. 3), than would be so, for example, in a disk shaped clearance formed between hypothetical adjacent sealing surfaces oriented transverse to the hub rotation axis 302 (i.e. horizontal in FIG. 3).

Figure 4:
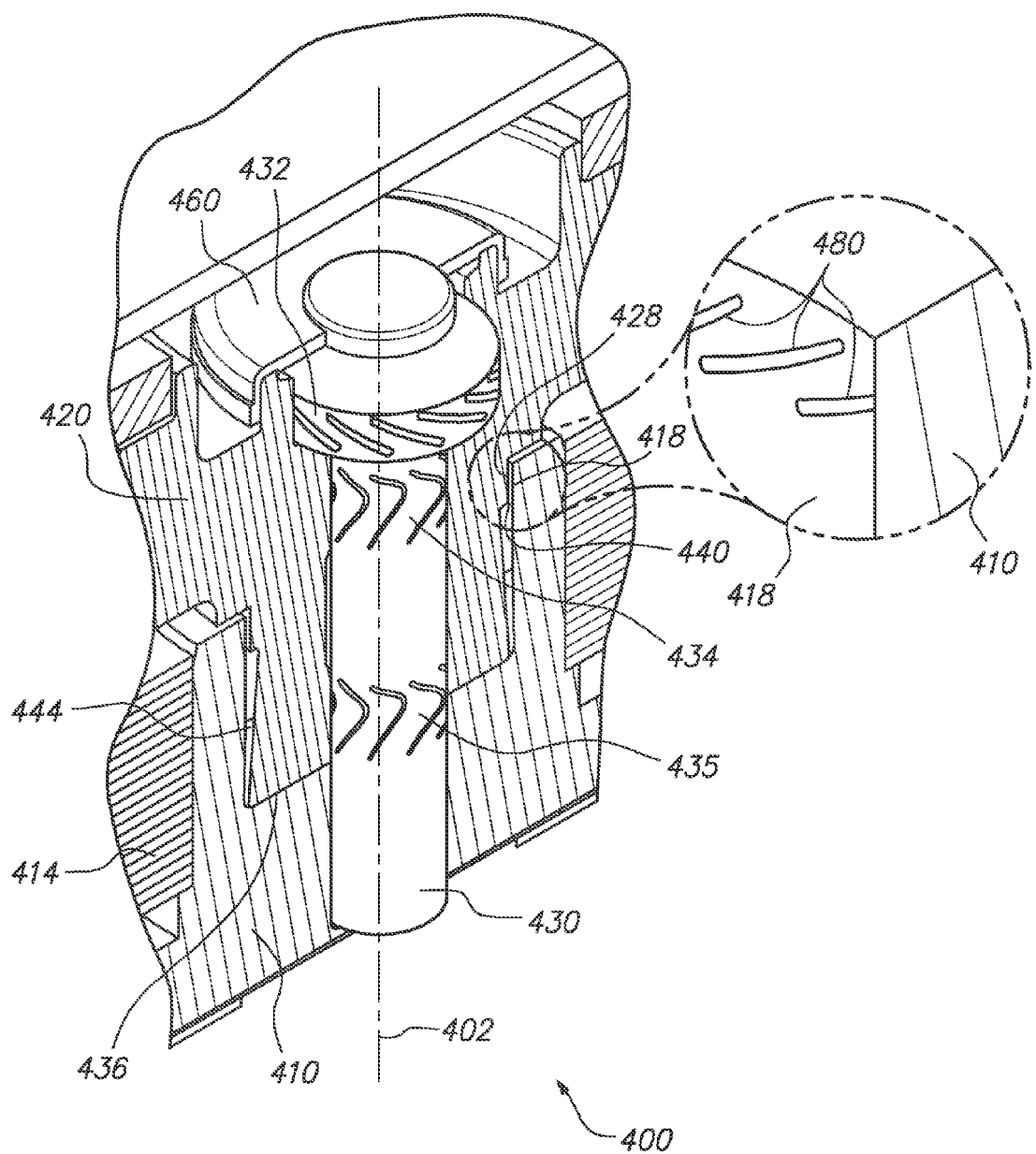
FIG. 4 is a cut away view of a spindle according to another example embodiment of the present invention.

FIG. 4 is a cut away view of a spindle 400 according to another example embodiment of the present invention. The spindle 400 includes a fixed member 410, and a rotatable hub 420 rotatably attached to the fixed member 410. In the embodiment of FIG. 4, the fixed member 410 includes a fixed shaft 430 and a fixed stator coil 414 that does not rotate relative to the fixed member 410. The rotation of the rotatable hub 420 relative to the fixed member 410 may be facilitated by a fluid bearing that shears and pressurizes a bearing lubricant 444 as a working fluid between bearing surfaces of the rotatable hub 420 and the bearing surfaces 434, 435, 432 of the fixed shaft 430 of the fixed member 410. Note that in the embodiment of FIG. 4, grooves in the bearing surfaces 434, 435, 432 of the fixed shaft 430 of the fixed member 410 may help pressurize the working fluid lubricant and thereby stiffen the fluid bearing to better control the rotational motion of the rotatable hub 420.

In the embodiment of FIG. 4, a conventional fluid bearing may also exist between certain other facing surfaces of the rotatable hub 420 and the fixed member 410, for example horizontal facing surfaces 436 that may form a so-called thrust bearing. The bearing lubricant 444 may comprise a light oil, for example. In an alternative embodiment, the bearing between the fixed shaft 430 of the fixed member 410 and the rotatable hub 420 may be a conventional ball bearing that is lubricated with grease. In the embodiment of FIG. 4, a bearing cap 460 may help reduce migration of the bearing lubricant 444 from the top of the spindle 400.

In the embodiment of FIG. 4, the fixed member 410 includes an immobile cylindrical surface 418 that is concentric about the hub rotation axis 402, and the rotatable hub 420 includes a rotatable cylindrical surface 428 that is also concentric about the hub rotation axis 402. In the embodiment of FIG. 4, the immobile cylindrical surface 418 of the fixed member 410 surrounds the rotatable cylindrical surface 428 of the rotatable hub 420. The rotatable cylindrical surface 428 faces and is separated from the immobile cylindrical surface 418 by a gas-filled radial clearance 440 of not less than 50 microns. In certain embodiments, the gas-filled radial clearance 440 may be filled with air from an environment outside the spindle 400. In certain alternative embodiments, the gas-filled radial clearance 440 may be filled with helium or nitrogen from an environment outside the spindle 400 but within a disk drive housing.

In the embodiment of FIG. 4, the immobile cylindrical surface 418 includes a plurality of grooves 480. For example, in certain embodiments the plurality of grooves 480 preferably defines a groove depth in the range of 10 microns to 30 microns. Note that the term cylindrical applies to the immobile cylindrical surface 418 in the present context, notwithstanding the grooves 480, in view of the cylindrical shape of the non-grooved portions of the rotatable cylindrical surface 418. Also, the gas-filled radial clearance 440 is measured from the non-grooved portions of the surfaces. That is, the gas-filled radial clearance 440 is not measured to include the groove depth.

In certain embodiments, because the gas-filled radial clearance 440 is not less than 50 microns, the grooves 480 on the immobile cylindrical surface 418 cannot serve as pumping grooves. Still, contrary to conventional wisdom, the grooves 480 can disturb the gas sufficiently to reduce migration of the bearing lubricant 444 away from the bearing through the gas-filled radial clearance 440. Hence, the gas-filled radial clearance 440 can function as an adequate seal that includes the immobile cylindrical surface 418 of the fixed member 410 and the rotatable cylindrical surface 428 of the rotatable hub 420, which seal is made effective enough by grooves 480 (even though the surface-to-surface clearance is too great for the grooves 480 to pump the gas). In certain embodiments, the gas-filled radial clearance 440 being not less than 50 microns represents a relaxed spacing between the immobile cylindrical surface 418 and the rotatable cylindrical surface 428, which relaxed spacing can facilitate a reduced manufacturing cost.

In the embodiment of FIG. 4, the gas-filled radial clearance 440 is shaped as a thin gaseous cylinder that is oriented parallel to the hub rotation axis 402 (i.e. vertical orientation in FIG. 4). In certain embodiments, such shape and orientation of the gas-filled radial clearance 440 enhances the sealing effect of the surface grooves 480, perhaps because fluid motion due to centrifugal forces may be better contained by adjacent surfaces that are parallel to the hub rotation axis 402 (i.e. vertical in FIG. 4), than would be so, for example, in a disk shaped clearance formed between hypothetical adjacent sealing surfaces oriented transverse to the hub rotation axis 402 (i.e. horizontal in FIG. 4).

Figure 5:
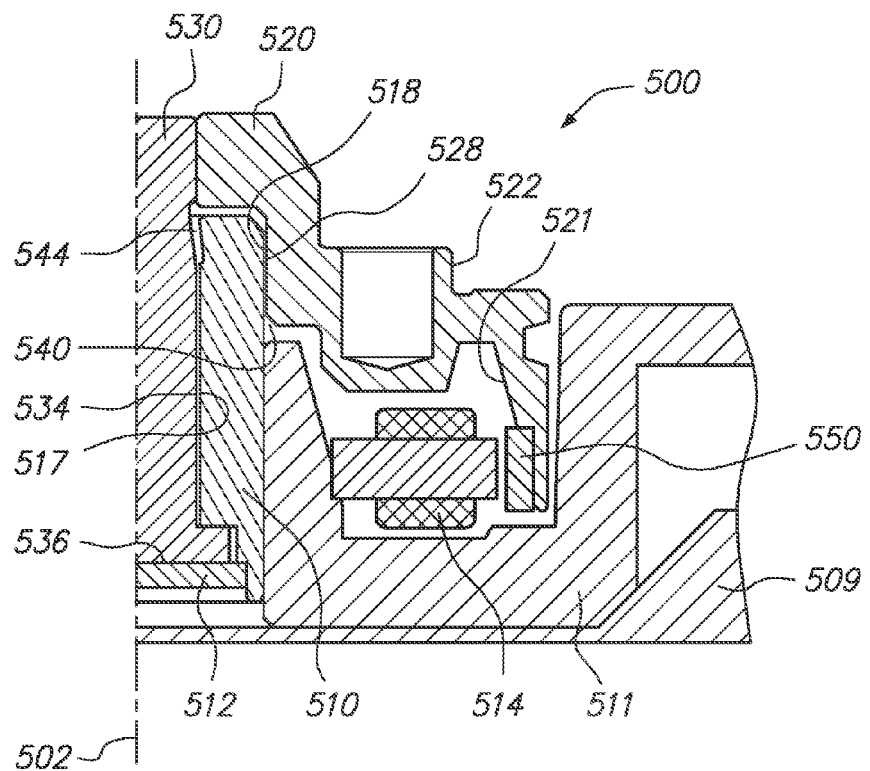
FIG. 5 is cross-sectional view of a spindle according to an example embodiment of the present invention.

FIG. 5 is cross-sectional view of a spindle 500 according to an example embodiment of the present invention. The spindle 500 includes fixed members 509, 510, 511, 512 and a rotatable hub 520 attached to a rotatable shaft 530. The rotatable shaft 530, in turn, is rotatably coupled to the fixed members 510, 512 by fluid bearings there between. In the embodiment of FIG. 5, the fixed member 511 includes a fixed stator coil 514 that does not rotate relative to the fixed members 509, 510, 511, 512. The rotatable hub 520 includes a rotatable ferromagnet 550 (e.g. an annular ferromagnet affixed to an inner surface 521 of the rotatable hub 520).

Magnetic interaction between the fixed stator coil 514 and the rotatable ferromagnet 550 may torque the rotatable hub 520, causing it to rotate relative to the fixed member 510 and about a hub rotation axis 502. Note that in the embodiment of FIG. 5, the rotatable hub 520 surrounds the ferromagnet 550 and the fixed stator coil 514. In this regard, the fixed stator coil 514 and the ferromagnet 550 may be considered as being optional "in-hub motor" components of the spindle 500.

In the embodiment of FIG. 5, the rotatable hub 520 may optionally include an outer cylindrical surface 522 about which a magnetic recording disk may be fitted. The rotation of the rotatable hub 520 relative to the fixed member 510 may be facilitated by a fluid bearing that shears and pressurizes a bearing lubricant 544 as a working fluid between the bearing surface 517 of the fixed member 510 and the bearing surface 534 of the rotatable shaft 530. In the embodiment of FIG. 5, a conventional fluid bearing may also exist between the horizontal facing surfaces 536 of the rotatable shaft 530 and the fixed member 512, which may form a so-called thrust bearing. The bearing lubricant 544 may comprise a light oil, for example.

In the embodiment of FIG. 5, the fixed member 510 includes an immobile cylindrical surface 518 that is concentric about the hub rotation axis 502, and the rotatable hub 520 includes a rotatable cylindrical surface 528 that is also concentric about the hub rotation axis 502. The rotatable cylindrical surface 528 faces and is separated from the immobile cylindrical surface 518 by a gas-filled radial clearance 540 of not less than 50 microns. In the embodiment of FIG. 5, the rotatable cylindrical surface 528 of the rotatable hub 520 surrounds the immobile cylindrical surface 518 of the fixed member 510.

In certain embodiments, the gas-filled radial clearance 540 may be filled with air from an environment outside the spindle 500. In certain alternative embodiments, the gas-filled radial clearance 540 may be filled with helium or nitrogen from an environment outside the spindle 500 but within a disk drive housing. In this context, a clearance is considered to be filled with helium or nitrogen if it is filled by a gas that is mostly helium or mostly nitrogen (i.e. 100% gas purity is not required).

In the embodiment of FIG. 5, the immobile cylindrical surface 518 and/or the rotatable cylindrical surface 528 includes a plurality of grooves (not shown in the cross-section of FIG. 5). Because the gas-filled radial clearance 540 is not less than 50 microns, the grooves on the immobile cylindrical surface 518 and/or the rotatable cylindrical surface 528 cannot serve as pumping grooves. Still, contrary to conventional wisdom, the grooves can disturb the gas sufficiently to reduce migration of the bearing lubricant 544 away from the bearing through the gas-filled radial clearance 540. Hence, the gas-filled radial clearance 540 can function as an adequate seal that includes the immobile cylindrical surface 518 of the fixed member 510 and the rotatable cylindrical surface 528 of the rotatable hub 520, which seal is made effective enough by grooves (even though the surface-to-surface clearance is too great for such grooves to pump the gas). In certain embodiments, the gas-filled radial clearance 540 being not less than 50 microns represents a relaxed spacing between the immobile cylindrical surface 518 and the rotatable cylindrical surface 528, which relaxed spacing can facilitate a reduced manufacturing cost.

In the embodiment of FIG. 5, the gas-filled radial clearance 540 is shaped as a thin gaseous cylinder that is oriented parallel to the hub rotation axis 502 (i.e. vertical orientation in FIG. 2). In certain embodiments, such shape and orientation of the gas-filled radial clearance 540 enhances the sealing effect of the surface grooves, perhaps because fluid motion due to centrifugal forces may be better contained by adjacent surfaces that are parallel to the hub rotation axis 502 (i.e. vertical in FIG. 5), than would be so, for example, in a disk shaped clearance formed between hypothetical adjacent sealing surfaces oriented transverse to the hub rotation axis 502 (i.e. horizontal in FIG. 5).

Figure 6:
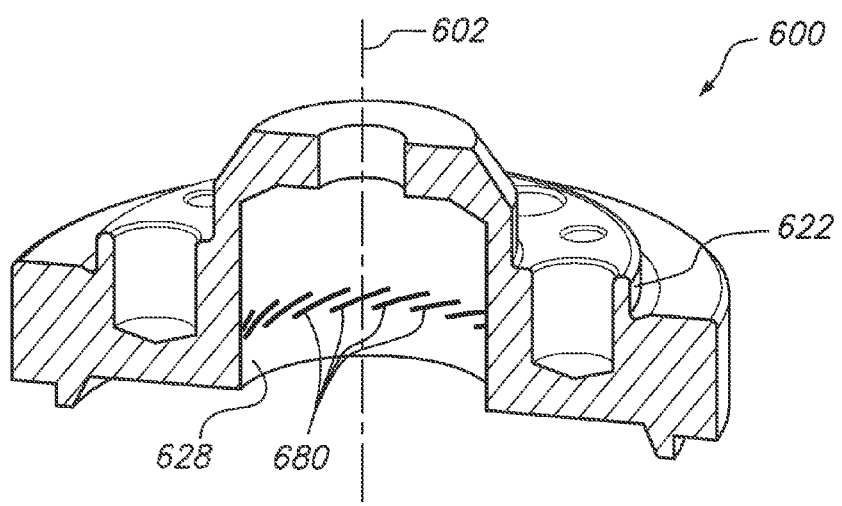
FIG. 6 is cross-sectional view of a rotatable spindle hub according to an example embodiment of the present invention.

FIG. 6 is cross-sectional view of a rotatable spindle hub 600 according to an example embodiment of the present invention. The rotatable hub 600 may optionally include an outer cylindrical surface 622 about which a disk storage media may be fitted. In the embodiment of FIG. 6, the rotatable hub 600 includes a rotatable cylindrical surface 628 that is concentric about a hub rotation axis 602. In the embodiment of FIG. 6, the rotatable cylindrical surface 628 of the rotatable hub 600 is designed to face and surround an immobile cylindrical surface of a fixed member of a spindle. In the embodiment of FIG. 6, the rotatable cylindrical surface 628 includes a plurality of grooves 680. Note that the term cylindrical applies to the rotatable cylindrical surface 628 in the present context, notwithstanding the grooves 680, in view of the cylindrical shape of the non-grooved portions of the rotatable cylindrical surface 628.

Figure 7:
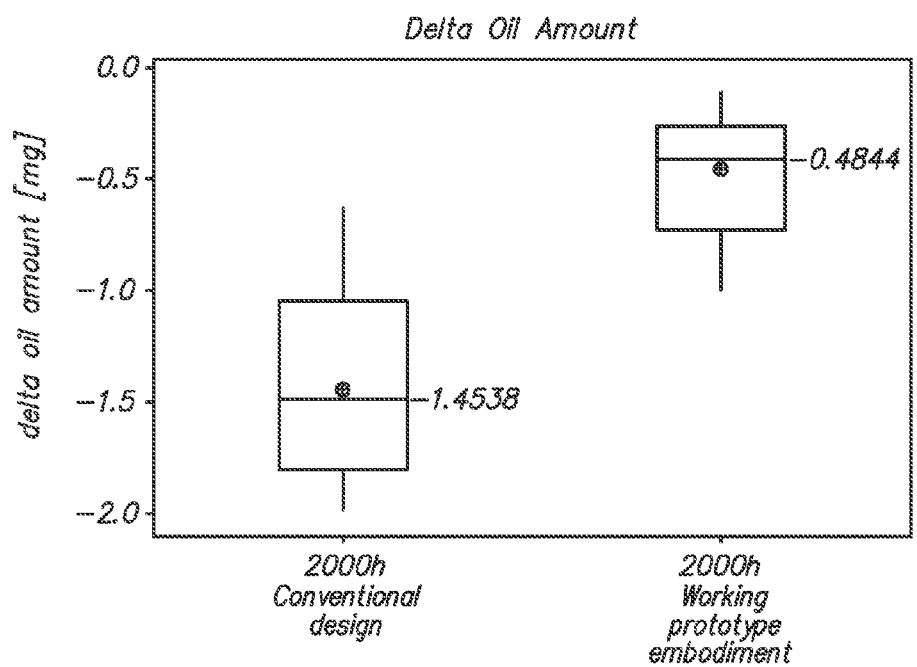
FIG. 7 is a tabular and graphical depiction of comparative performance data obtained for an example embodiment of the present invention.

The inventors tested a working prototype of an embodiment of the present invention, with the results of the test being accelerated by continuous spin and elevated temperature. A tabular and graphical depiction of the results after 2000 hours of the lubricant evaporation test is shown in FIG. 7. Specifically, the data of FIG. 7 indicates that a working prototype embodiment of the present invention was able to reduce the bearing fluid/lubricant evaporation amount by about 60% or more compared to a conventional design. Yet the expected manufacturing cost of parts according to the tested embodiment was not substantially increased relative to the conventional design, because according to an embodiment of the invention the clearance between parts does not need to be excessively reduced relative to that for conventional designs.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A spindle comprising:
 a fixed member;
 a hub rotatably attached to the fixed member, the hub defining a hub rotation axis;
 a bearing between the rotatable hub and the fixed member, the bearing including a bearing lubricant; and
 a seal for reducing migration of the bearing lubricant away from the bearing, the seal comprising:
  an immobile cylindrical surface of the fixed member having a plurality of grooves, the immobile cylindrical surface being concentric about the hub rotation axis,
  a rotatable cylindrical surface of the hub, the rotatable cylindrical surface being concentric about the hub rotation axis, the rotatable cylindrical surface facing and being separated from the immobile cylindrical surface by a gas-filled radial clearance of not less than 50 microns, the gas-filled radial clearance being shaped as a thin gaseous right circular cylinder.

2. The spindle of claim 1 wherein the bearing is a fluid bearing that shears and pressurizes the bearing lubricant as a working fluid.

3. The spindle of claim 1 wherein the gas-filled radial clearance is a radial space between the rotatable cylindrical surface of the hub and the immobile cylindrical surface of the fixed member that is filled with air from an environment outside the spindle.

4. The spindle of claim 1 wherein the gas-filled radial clearance is a radial space between the rotatable cylindrical surface of the hub and the immobile cylindrical surface of the fixed member that is filled with helium or nitrogen from an environment outside the spindle but within a disk drive housing.

5. The spindle of claim 1 further comprising a ferromagnet and a coil for rotating the hub relative to the fixed member, wherein the hub surrounds the ferromagnet and the coil, and the ferromagnet is attached to and rotates with the hub, and the coil does not rotate relative to the fixed member.

6. The spindle of claim 1 wherein the rotatable cylindrical surface of the hub surrounds the immobile cylindrical surface of the fixed member.

7. The spindle of claim 1 wherein at least one of the plurality of grooves defines a groove depth in the range of 10 microns to 30 microns.

8. A spindle comprising:
a fixed member;
a hub rotatably attached to the fixed member, the hub defining a hub rotation axis;
a bearing between the rotatable hub and the fixed member, the bearing including a bearing lubricant; and
a seal for reducing migration of the bearing lubricant away from the bearing, the seal comprising:
an immobile cylindrical surface of the fixed member, the immobile cylindrical surface being concentric about the hub rotation axis,
a rotatable cylindrical surface of the hub having a plurality of grooves, the rotatable cylindrical surface being concentric about the hub rotation axis, the rotatable cylindrical surface facing and being separated from the immobile cylindrical surface by a gas-filled radial clearance of not less than 50 microns, the gas-filled radial clearance being shaped as a thin gaseous right circular cylinder.

9. The spindle of claim 8 wherein the bearing is a fluid bearing that shears and pressurizes the bearing lubricant as a working fluid.

10. The spindle of claim 8 wherein the gas-filled radial clearance is a radial space between the rotatable cylindrical surface of the hub and the immobile cylindrical surface of the fixed member that is filled with air from an environment outside the spindle.

11. The spindle of claim 8 wherein the rotatable cylindrical surface of the hub surrounds the immobile cylindrical surface of the fixed member.

12. The spindle of claim 8 wherein at least one of the plurality of grooves defines a groove depth in the range of 10 microns to 30 microns.

13. A disk drive comprising:
a disk drive base;
an actuator attached to the disk drive base;
a read head attached to the actuator;
a spindle attached to the disk drive base, the spindle comprising
a fixed member attached to the disk drive base;
a hub rotatably attached to the fixed member, the hub defining a hub rotation axis;
a bearing between the rotatable hub and the fixed member, the bearing including a bearing lubricant; and
a seal for reducing migration of the bearing lubricant away from the bearing, the seal comprising:
an immobile cylindrical surface of the fixed member having a plurality of grooves, the immobile cylindrical surface being concentric about the hub rotation axis,
a rotatable cylindrical surface of the hub, the rotatable cylindrical surface being concentric about the hub rotation axis, the rotatable cylindrical surface facing and being separated from the immobile cylindrical surface by a gas-filled radial clearance of not less than 50 microns, the gas-filled radial clearance being shaped as a thin gaseous right circular cylinder; and
at least one disk attached to the hub.

14. The disk drive of claim 13 wherein the bearing is a fluid bearing that shears and pressurizes the bearing lubricant as a working fluid.

15. The disk drive of claim 13 wherein the gas-filled radial clearance is a radial space between the rotatable cylindrical surface of the hub and the immobile cylindrical surface of the fixed member that is filled with air from an environment outside the spindle.

16. The disk drive of claim 13 wherein the rotatable cylindrical surface of the hub surrounds the immobile cylindrical surface of the fixed member.

17. The disk drive of claim 13 wherein at least one of the plurality of grooves defines a groove depth in the range of 10 microns to 30 microns.

18. A disk drive comprising:
a disk drive base;
an actuator attached to the disk drive base;
a read head attached to the actuator;
a spindle attached to the disk drive base, the spindle comprising
a fixed member attached to the disk drive base;
a hub rotatably attached to the fixed member, the hub defining a hub rotation axis;
a bearing between the rotatable hub and the fixed member, the bearing including
a bearing lubricant; and
a seal for reducing migration of the bearing lubricant away from the bearing, the seal comprising:
an immobile cylindrical surface of the fixed member, the immobile cylindrical surface being concentric about the hub rotation axis,
a rotatable cylindrical surface of the hub having a plurality of grooves, the rotatable cylindrical surface being concentric about the hub rotation axis, the rotatable cylindrical surface facing and being separated from the immobile cylindrical surface by a gas-filled radial clearance of not less than 50 microns, the gas-filled radial clearance being shaped as a thin gaseous right circular cylinder; and
at least one disk attached to the hub.

19. The disk drive of claim 18 wherein the bearing is a fluid bearing that shears and pressurizes the bearing lubricant as a working fluid.

20. The disk drive of claim 18 wherein the gas-filled radial clearance is a radial space between the rotatable cylindrical surface of the hub and the immobile cylindrical surface of the fixed member that is filled with air from an environment outside the spindle.

21. The disk drive of claim 18 wherein the rotatable cylindrical surface of the hub surrounds the immobile cylindrical surface of the fixed member.

22. The disk drive of claim 18 wherein at least one of the plurality of grooves defines a groove depth in the range of 10 microns to 30 microns.

* * * * *